Patented Mar. 8, 1932

1,848,884

UNITED STATES PATENT OFFICE

IRA T. HOOK, OF NEW HAVEN, CONNECTICUT, ASSIGNOR TO THE AMERICAN BRASS COMPANY, OF WATERBURY, CONNECTICUT, A CORPORATION OF CONNECTICUT

FLUX FOR BRAZING AND WELDING

No Drawing.   Application filed April 11, 1929. Serial No. 354,444.

This invention relates to the art of brazing and welding, and more particularly to a flux for use in the brazing and welding operation, and has for an object the production of a flux which will give a better and stronger weld and with less trouble than are secured with the old types of fluxes.

It is also an object of the invention to provide a flux which has a surface tension which is greater than that of the usual fluxes, so that it will more readily and completely spread over the surface of the pool or both in the welding operation, and afford greater protection to this bath against oxidation, dissolving of hot gases and so forth.

It is another object of the invention to provide a flux which will have a certain alloying power with the weld metal and rendering the latter stronger, tougher and more dense. It has long been common practice to use a flux in connection with brazing or welding for the purposes and objects of:— (1) dissolving and taking up the oxides which are formed from both the base metal and the added metal; (2) for shielding or blanketing the molten metal from the attack of oxygen; (3) for shielding the molten metal from the hot gases which otherwise would be dissolved by the molten metal, and in most cases be rejected at the freezing point making blowholes; (4) reducing the oxides which are formed; (5) cleansing the base metal in order to secure more perfect adherence of the added metal; (6) improving the flow of the molten metal so that the surface of the finished weld will have a smooth bright appearance; (7) suppressing the vapors which tend to coat the surface of the metal to be welded, thus loading the flux. This vapor or smoke also makes the act of welding very uncomfortable for the welder.

For the purposes above described those in the art of welding and brazing commonly used sodium tetra-borate (common borax) or fused borax in which the water of crystallization has been driven off, mixed in varying proportions with sodium carbonate, sodium bicarbonate, boric acid, ammonium chloride, sodium chloride, sodium or potassium fluoride, silicon dioxide, etc. In these fluxes the boron salts alone or acting with the silicon dioxide and sodium salts constitute the oxide dissolving agents, and the chlorides the cleansing agents. Some of the agents are added merely to prevent the formation of the hard closely clinging glass which results from the use of borax alone.

These fluxes however, are lacking in several desirable features as follows:—(1) they carry no reducing agents so that oxides once formed remain as such; (2) they do not afford full protection for the molten metal from the attack of the hot oxygen, forming occasional islands of flux on the pool or molten metal instead of a complete covering; (3) they do not protect the molten metal from the hot gases which by reason of this absence of protection are dissolved in the molten bath and on freezing of the bath separate out making blowholes; (4) in the case of welding or brazing with zinc composition these fluxes do not suppress the zinc oxide smoke, which oxide is deposited on the metal to be welded, diminishing the adherence of the added metal or quickly rendering the flux impotent by loading it with oxide; (5) they have no alloying power with the weld metal itself.

I overcome these objections by the addition of metallic silicon in varying proportions with any of the above agents or different combinations of them, the proportion of the silicon being preferably from about five per cent to about twenty-five percent of the flux by weight. The metallic silicon may be added as powder or in small particles, either as free silicon or as an alloy with another metal, which alloy is rich in silicon. The silicon is a powerful reducing agent. It combines with the boron, with oxygen and the other elements to form a tough impervious layer which covers the pool of molten metal, effectually screening it from both the oxygen attack and the hot gases which tend to dissolve in the molten metal. The weld therefore, has a smoother, more workman like appearance, the weld metal is denser and stronger by reason of the fact that gases do not come in contact with the molten metal, and in the case of welding with zinc mixtures, the zinc oxide smoke is largely suppressed. Furthermore, a portion of the silicon alloys with the weld metal rendering the latter stronger, tougher, and more dense.

As indicated above the metallic silicon may be in the form of free silicon or it may be used as an alloy of some other metal rich in silicon and it is added to the other elements of the flux in powdered form or in small particles whether it is free silicon or an alloy. For example it could be alloyed with copper, cobalt or nickle and the percentage of silicon in the alloy could be anywhere from 15 to 100 per cent.

Another way in which the metallic silicon could be used with the flux is as a coating on welding rods. The rod could be coated with the metallic silicon or with the alloy rich in silicon and a suitable binder and then used with the flux in the usual manner, or the silicon or silicon-rich metal alloy could be mixed as fine particles with the other materials of the flux as above noted, and then this mixture applied as a coating to the weld rod, it being held thereto by a suitable binder such for example, as glucose.

The presence of the metallic silicon in the flux gives a much better and stronger weld. It unites with the weld metal, toughening and strengthening it, rendering it more dense, and also increasing its ability to alloy with the metals being welded. It produces a flux having a greater surface tension than that of the usual fluxes so that it will spread completely over the surface of the pool or bath and will thus prevent the surface of the weld metal from taking up oxygen from the air, and preventing the dissolving of hot gases by the molten metal. As these gases in most cases are later separated out as the metal freezes and form blowholes, this flux therefore, prevents the formation of these blowholes. Also in case of brazing or welding with zinc compositions my improved flux suppresses the zinc oxide smoke, thus preventing its deposit on the metal to be welded with the consequent diminishing of the adherence of the added metal or rendering the flux impotent by loading it with oxides. Still further as the zinc oxide smoke is suppressed this flux renders the work much more comfortable to the welder and thus makes it easier to produce better welds.

Having thus set forth the nature of my invention, what I claim is:

A brazing or welding flux consisting predominately of sodium salts and small particles of metallic silicon in form other than ferro-silicon, the silicon being present in amount between 5 percent and 25 percent.

In testimony whereof I affix my signature.

IRA T. HOOK.